H. V. Belding.
Cow Milker.

No. 43,764. Patented Aug. 9, 1864.

Witnesses:
Henry Morris,
Geo. W. Reed

Inventor:
H. V. Belding
per Munn & Co.
Attorneys

UNITED STATES PATENT OFFICE.

H. V. BELDING, OF OPPENHEIM, NEW YORK.

MILKING-MACHINE.

Specification forming part of Letters Patent No. 43,754, dated August 9, 1864.

*To all whom it may concern:*

Be it known that I, H. V. BELDING, of Oppenheim, in the county of Fulton and State of New York, have invented a new and Improved Machine for Milking Cows; and I do hereby declare that the following is a full, clear, and exact description thereof, which will enable any person skilled in the art to make and use the same, reference being had to the accompanying drawings, making a part of this specification, in which—

Figure 1:
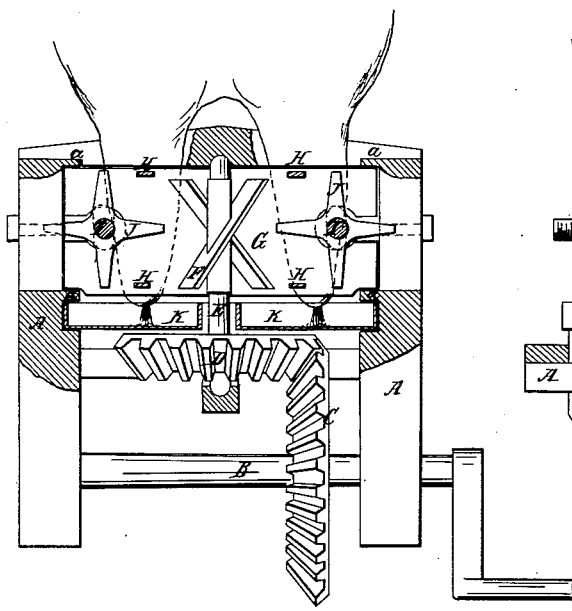
Figure 2:
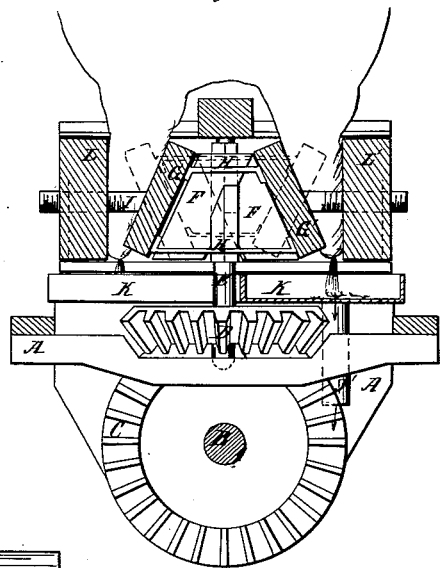
Figure 3:
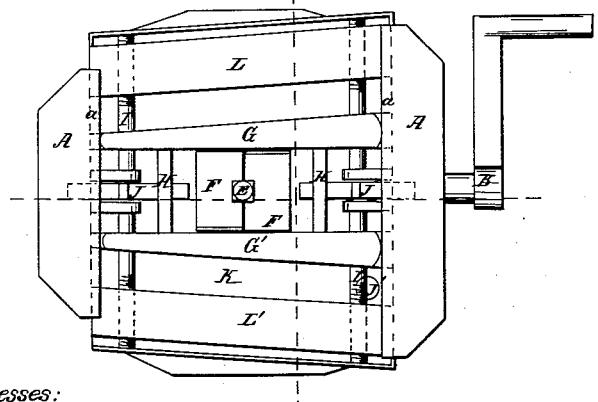

Figure 1 is a side sectional elevation of my invention. Fig. 2 is an end sectional elevation of the same. Fig. 3 is a plan view of the same.

Similar letters of reference indicate like parts.

This machine is intended to act upon the teats of the cow or animal to be milked much in the same manner as the human hand acts in the operation of milking—that is to say, the machine presses the teat first at the neck or upper part, then upon the body thereof, and then upon its lower part.

I provide a suitable rectangular frame, A, made as shown or in any form which the skill of the maker may suggest. In this frame I mount a driving crank-shaft, B, and pinion C, which latter gears with a pinion, D, on the lower end of the vertical shaft E. By turning the crank-shaft B motion is imparted to shaft E. This shaft has attached to it a pair of blades or wings, F, arranged as shown.

Within the frame A, upon each side of the shaft E, there is a loose flat plate or presser, G G', which are connected together at top and bottom by springs H H, of rubber or other material. These springs serve to draw the pressers G G' toward each other, and they thus press or clasp the wings F F between them. By the rotation of the wings their sides and edges are alternately presented against the sides of the pressers, which latter are thus alternately driven apart by the edges of the wings and then drawn by the springs H toward the sides of the rings. The pressers G G' are thus made to open and close by the rotation of the shaft E.

It is to be particularly observed that the inclined position of the wings F F causes the upper corner of each wing to strike first against the upper part of the presser, pushing its upper part over into the inclined position shown in red, Fig. 2, and then, as the wing advances, allowing the presser to assume a perpendicular position till the lower corner of the wing begins to act on the corner part of the presser, by which the lower part of the presser is thrown or pressed out while the upper part thereof falls in, as shown in Fig. 2. The pressers G G' thus have a wabbling motion, while at the same time they advance and recede horizontally.

Opposite to the face of each of the pressers G G' is an adjustable plate, L L', toward which the pressers act, and the cow or animal is milked by having her teats introduced between the plates L L' and the pressers G G', as indicated by the red lines, Figs. 1 and 2. The plates L L' are adjusted to or from the the pressers G G' by means of the horizontal screw-rods I I, which have a screw-thread at each end, which enters a corresponding nut in each end of the plates L L'. At the center of each screw-rod I there is a finger-spoke, J, by which the rods I I are turned and the plates L L' adjusted at pleasure. The object of this adjustment is to permit the convenient regulation of the degree of pressure imparted to the animal's teats, and also to adjust the machine to teats of different sizes. The nearer the plates L L' are brought toward the wings F of course the greater will be the pressure upon the teats of the animal, while the pressure will be less when the plates are adjusted outward. The screw-rods I pass through the pressers G G', the latter being perforated for that purpose. The rods I thus serve in some degree to guide the pressers G G', at the same time allowing them to have the wabbling motion before spoken of. The edges of the frame, as shown at *a a*, also assist in guiding the pressers G G' and preventing them from becoming displaced.

The pressers, instead of being connected, may have independent springs. Instead of one presser to act upon each pair of teats, there may be a separate presser for each teat. Under the pressers I arrange a pan, K, which receives the milk and conducts it through pipe J' to a pail, trough, or other suitable receptacle.

This machine is intended to be attached to an arm or bar of a suitable stool or support, of such form that when applied under the cow's bag to the teats the crank will be in convenient position for the operator. The action of the pressers is first to squeeze the neck of the teat, then press downward upon the body thereof, and finally squeeze the lower part, the whole movement or action being substantially the same as the operation of hand-milking.

I find in practice that the best proportion for the speed of the winged shaft is to have its pinion-wheel so made that said shaft will have six and a half revolutions to each revolution of the crank-shaft. The time and power expended in producing this revolution is about the same as that required to press a a single teat once with the hand in the common manner.

I do not limit myself to the precise form, construction, or arrangement of the parts of the machine, for they may be varied at will.

Having thus described my invention, I claim as new and desire to secure by Letters Patent—

1. The use of one or more pressers, G G', acting substantially in the manner and for the purpose herein shown and described.

2. The combination of the plates L L' with the pressers G G', substantially as herein shown and described, for the purpose set forth.

3. The combination of the winged shaft E with the pressers G G', substantially in the manner and for the purpose herein shown and described.

4. The springs H H, in combination with the pressers G G', substantially as herein set forth.

5. The adjusting screw-rods I, in combination with the plates L L', substantially as and for the purpose herein shown and described.

6. The arrangement of the pan K with the pressers G G' and plates L L', as herein shown and described.

H. V. BELDING.

Witnesses:
C. D. BEAN,
C. H. EIGENBROADT.